US009264500B2

(12) United States Patent
Statler et al.

(10) Patent No.: US 9,264,500 B2
(45) Date of Patent: Feb. 16, 2016

(54) METHOD AND APPARATUS FOR OPTIMIZED OBJECT SEARCHING

(75) Inventors: Stephen Bryant Statler, San Diego, CA (US); Eric Robert Kraar, Atlanta, GA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 13/494,579

(22) Filed: Jun. 12, 2012

(65) Prior Publication Data

US 2013/0331071 A1     Dec. 12, 2013

(51) Int. Cl.
*H04M 3/42* (2006.01)
*H04L 29/08* (2006.01)
*H04W 4/00* (2009.01)
*H04W 4/02* (2009.01)
*G06F 17/30* (2006.01)

(52) U.S. Cl.
CPC ............ *H04L 67/20* (2013.01); *G06F 17/3087* (2013.01); *H04W 4/003* (2013.01); *H04W 4/021* (2013.01); *H04W 4/023* (2013.01)

(58) Field of Classification Search
CPC .... H04L 67/20; H04W 4/003; H04W 4/0023; H04W 4/021; H04W 4/00; G06Q 30/0601; G06Q 30/0244; G06Q 30/0629
USPC .................. 455/414.2, 556.1; 370/528, 241; 379/267, 42, 219, 224, 229; 375/347, 375/150, 130
See application file for complete search history.

(56) References Cited

U.S. PATENT DOCUMENTS

| 7,308,356 | B2 | 12/2007 | Melaku et al. | |
| 7,403,939 | B1* | 7/2008 | Virdy | 707/718 |
| 7,707,073 | B2 | 4/2010 | Bloebaum et al. | |
| 7,739,157 | B2 | 6/2010 | Bonner et al. | |
| 2002/0042259 | A1* | 4/2002 | Goia | H04W 8/005 455/403 |
| 2004/0097218 | A1* | 5/2004 | Vossler | H04M 1/663 455/418 |
| 2004/0203852 | A1* | 10/2004 | Janakiraman | H04W 4/02 455/456.1 |
| 2006/0100925 | A1* | 5/2006 | Finaly | G06Q 20/387 705/14.35 |
| 2007/0112729 | A1* | 5/2007 | Wiseman et al. | 707/3 |
| 2007/0150362 | A1 | 6/2007 | Sharma et al. | |
| 2007/0150444 | A1* | 6/2007 | Chesnais | H04W 4/02 |
| 2008/0074264 | A1 | 3/2008 | Sharpe et al. | |

(Continued)

FOREIGN PATENT DOCUMENTS

GB           2483905 A     3/2012
WO    WO-2008056283 A2     5/2008

OTHER PUBLICATIONS

International Search Report—PCT/US2013/043876—ISA/EPO—Feb. 17, 2014.

(Continued)

*Primary Examiner* — Mahendra Patel
(74) *Attorney, Agent, or Firm* — Shirin Tefagh; Joseph Agusta

(57) ABSTRACT

Apparatus and methods are described herein for optimizing an object search. A communications device may be configured to initiate a request for a data set. The communications device may transmit its current location to a server, for example, which may return a data set including data representing each of one or more objects that may be located within a first search area proximate to the current location of the communications device. The communications device may then perform a search for an object of interest by comparing the data representing each of the one or more objects in the data set to data representing the object of interest.

36 Claims, 7 Drawing Sheets

(56) References Cited

U.S. PATENT DOCUMENTS

| | | | |
|---|---|---|---|
| 2008/0238615 A1* | 10/2008 | Carpenter | 340/5.91 |
| 2008/0249898 A1* | 10/2008 | Ratnakar | 705/27 |
| 2008/0306787 A1 | 12/2008 | Hamilton et al. | |
| 2009/0083237 A1* | 3/2009 | Gelfand | G06F 17/30265 |
| 2009/0138376 A1* | 5/2009 | Smyers et al. | 705/27 |
| 2010/0151901 A1* | 6/2010 | Roden et al. | 455/556.1 |
| 2010/0210287 A1* | 8/2010 | De Vries | H04L 63/0492 455/456.3 |
| 2010/0241507 A1* | 9/2010 | Quinn et al. | 705/14.42 |
| 2011/0215138 A1 | 9/2011 | Crum | |
| 2011/0218984 A1* | 9/2011 | Gaash et al. | 707/706 |
| 2011/0276385 A1* | 11/2011 | Keller | 705/14.38 |
| 2012/0025976 A1* | 2/2012 | Richey | H04L 67/38 340/539.13 |
| 2012/0052880 A1* | 3/2012 | Hymel | H04W 4/206 455/456.3 |

OTHER PUBLICATIONS

Written Opinion—PCT/US2013/043876—ISA/EPO—Feb. 17, 2014.

* cited by examiner

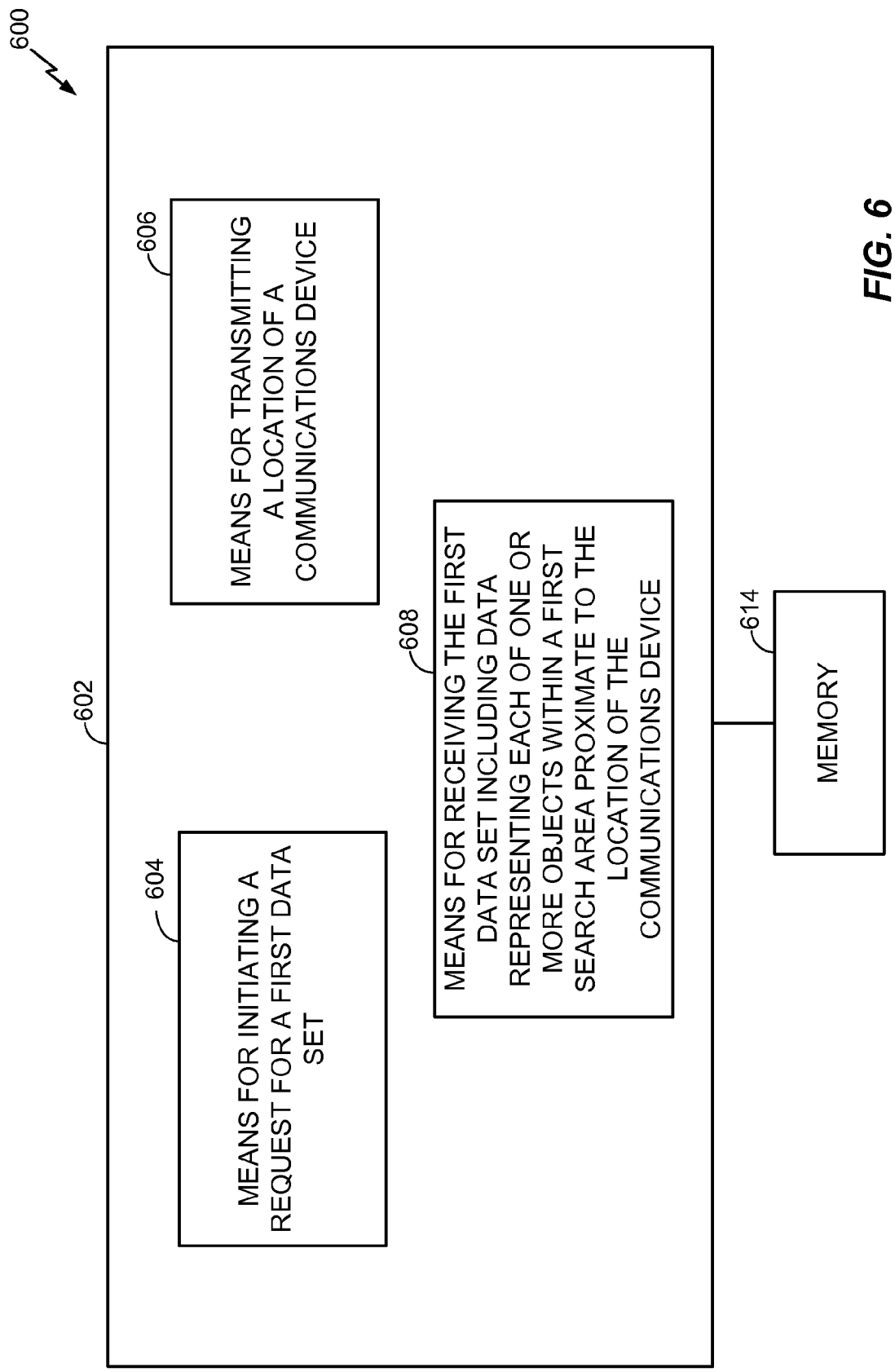

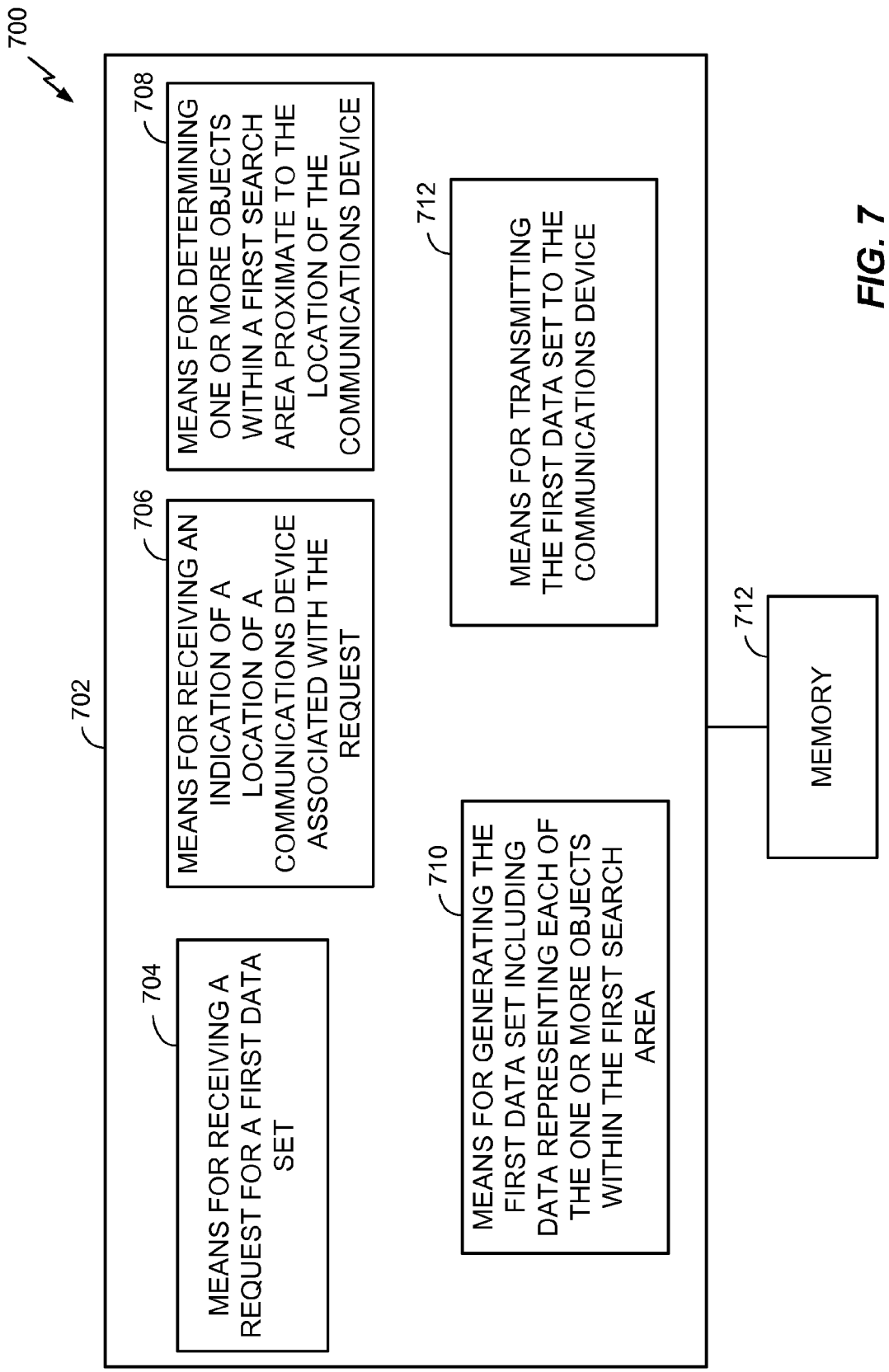

METHOD AND APPARATUS FOR OPTIMIZED OBJECT SEARCHING

BACKGROUND

This application relates generally to object searching, and more particularly to communications device based object searching using location.

As the use of mobile devices for everyday tasks, including shopping, increases, developers are deploying high quality shopping applications to support shoppers while shopping. For example, a user may wish to retrieve additional information about an object of interest via a communications device, such as a mobile communications device. In a typical object search method, the communications device can transmit a search request to a remote device, such as a server, and the remote device can perform the search and return the desired information to the communications device. Performing such a search locally, on the communications device, is typically not feasible due to the potentially large amounts of data required for completing a search. That is, due to limited resources available on typical mobile communications devices, it is not feasible to store the large amounts of data used in object searching.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with some aspects, a method is described herein for optimizing object searching on a communications device. The method may include initiating a request for a first data set. The method may also include transmitting a location of the communications device. In addition, the method may include receiving, at the communications device, the first data set, the first data set including data representing each of one or more objects within a first search area proximate to the location of the communications device.

In accordance with some aspects, a computer program product is described herein. The computer program product includes a computer-readable medium that includes at least one instruction for causing a computer to initiate a request for a first data set. The computer-readable medium may also include at least one instruction that causes the computer to transmit a location of the communications device. In addition, the computer-readable medium may also include at least one instruction that causes the computer to receive, at the communications device, the first data set. The first data set includes data representing each of one or more objects within a first search area proximate to the location of the communications device.

In accordance with some aspects, an apparatus is described herein that includes means for initiating a request for a first data set. The apparatus may also include means for transmitting a location of the communications device. In addition, the apparatus may include means for receiving, at the communications device, the first data set. The first data set includes data representing each of one or more objects within a first search area proximate to the location of the communications device.

In accordance with some aspects, an apparatus for optimizing object searching on a communications device is described herein. The apparatus may include at least one processor, and a memory coupled to the at least one processor. The at least one processor may be configured to initiate a request for a first data set. The at least one processor may also be configured to transmit a location of the communications device. In addition, the at least one processor may be configured to receive, at the communications device, the first data set. The first data set includes data representing each of one or more objects within a first search area proximate to the location of the communications device.

In accordance with some aspects, a method for providing an optimized data set is described herein. The method may include receiving a request for a first data set. The method may also include receiving an indication of a location of a communications device associated with the request for the first data set. The method may also include determining one or more objects within a first search area proximate to the location of the communications device. Additionally, the method may include generating the first data set. The first data set includes data representing each of the one or more objects within the first search area, and transmitting the first data set to the communications device.

In accordance with some aspects, a computer program product is described herein. The computer program product includes a computer-readable medium that includes at least one instruction for causing a computer to receive a request for a first data set, and at least one instruction for causing the computer to receive an indication of a location of a communications device associated with the request for the first data set. The computer-readable medium may also include at least one instruction that causes the computer to determine one or more objects within a first search area proximate to the location of the communications device. The computer-readable medium may also include at least one instruction that causes the computer to generate the first data set. The first data set includes data representing each of the one or more objects within the first search area, and at least one instruction that causes the computer to transmit the first data set to the communications device.

In accordance with some aspects, an apparatus is described herein that includes means for receiving a request for a first data set, and means for receiving an indication of a location of a communications device associated with the request for the first data set. The apparatus may also include means for determining one or more objects within a first search area proximate to the location of the communications device. Additionally, the apparatus may include means for generating the first set including data representing each of the one or more objects within the first search area, and means for transmitting the first data set to the communications device.

In accordance with some aspects, an apparatus for providing an optimized data set is described herein. The apparatus may include at least one processor and a memory coupled to the at least one processor. The at least one processor may be configured to receive a request for a first data set and to receive an indication of a location of a communications device associated with the request for the first data set. The at least one processor may also be configured to determine one or more objects within a first search area proximate to the location of the communications device. The at least one processor may also be configured to generate the first data set including data representing each of the one or more objects within the first search area, and to transmit the first data set to the communications device.

To the accomplishment of the foregoing and related ends, the one or more aspects comprise the features hereinafter described in detail and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 depicts an apparatus for optimized searching, in accordance with some disclosed aspects; and FIG. 7 depicts another apparatus for providing a data set, in accordance with some disclosed aspects.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Apparatus and methods are described herein for optimizing an object search. The object search may be, for example, a visual search for information about an object of interest. While examples of visual searches are described herein, the described methods and apparatus are equally applicable to non-visual based searching such as, for example, text-based searching, audio-based searching, etc. A communications device may be configured to capture an image of an object of interest. The communications device may transmit its current location to a server, for example, which may return a data set including data representing each of one or more objects that may be located proximate to the current location of the communications device. The communications device may then efficiently perform a search for the object of interest by comparing the data representing each of the objects in the data set to data representing the object of interest. In the case of visual searching, for example, the data representing each of the one or more objects in the data set may include a visual representation of each object, such as an image. The communications device may be configured to compare the image of the object of interest to each visual representation in the data set to find a match. By using location as a filter, the communications device can perform the search locally as only data representing objects within a selected proximity of the communications devices is stored on the communications device.

Figure 1:
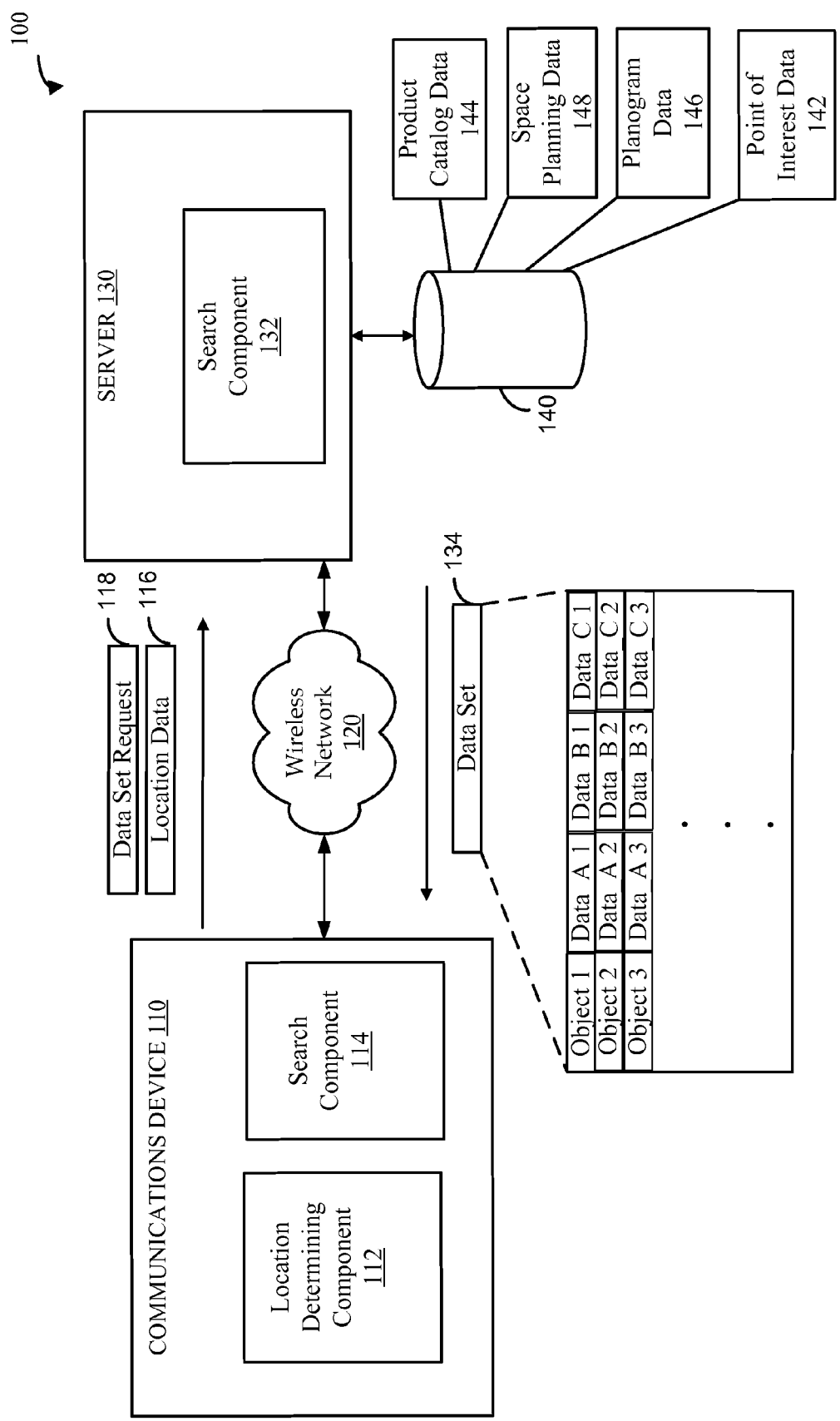
FIG. 1 is a block diagram illustrating a system for implementing one or more aspects described herein.

FIG. 1 depicts a system 100 that may implement various disclosed aspects. System 100 may include a server 130 communicatively coupled to one or more communications device(s) 110 via a network 120. Communications device(s) 110 may include, for example, a wireless phone, cellular phone, smartphone, portable digital assistant (PDA), and/or any other electronic communications device. In some aspects, communications device 110 may include a location determining component 112 and a search component 114. Location determining component 112 may be configured to determine a location of communications device 110 at any given time. The location of the communications device 110 may be used, for example, in retrieving a data set containing data representing each of one or more objects within a selected proximity of the communications device when initiating an object search, for example. In some aspects, the selected proximity may be user-selectable. In other aspects, the selected proximity may be determined based on an accuracy associated with the location determining component 112. Location determining component 112 may determine location using a global positioning system (GPS) or other location services associated with communications device 110. Location determining component 112 may also use indoor navigation techniques to determine the location of communications device 110.

Search component 114 may be configured to initiate a search for an object of interest. For example, if a user of communications device 110 is in a retail store and would like to obtain more information about an object of interest, the user may capture an image of the object. Search component 114 may be configured to retrieve the location of communications device 110 from location determining component 112, and to forward the location to search component 132, associated with server 130, as shown at 116, along with a request for a data set comprising data representing each of one or more objects located proximate to the communications device based on the location of the communications device, as shown at 118. Search component 114 may be configured to receive the data set and compare data representing the object of interest (e.g., an image of the object, in the case of a visual search) to the data representing each of the one or more objects in the data set to find a match. The first data set comprises data representing one or more objects within a first search area that is less than the entire search space available to server 130. In some aspects, a match may not be found in a first data set received by search component 114. For example, in a retail store, an object may not be placed in its designated location, such as a particular aisle. As such, the first data set may not include data related to the misplaced object when the first search area does not include the designated location of the misplaced object. Search component 114 may be configured to request one or more additional data sets. The one or more additional data sets may include objects in a larger or different search area than the first data set received by search component 114. For example, in the case of a retail store, the additional data sets may include more or different aisles within the store In accordance with some aspects, search component 114 may be configured to receive a first data set, such as data set 134, including data representing each of one or more objects located proximate to the communications device 110 before a specific search is initiated. For example, search component 114 may be configured to automatically request a first data set upon crossing a geofence set up in a location, scanning a tag associated with a location, etc. In some aspects, the first data set may be updated automatically as the communications device 110 moves to other locations. A user of communications device 110 may later decide to initiate a search for a specific object. For example, the communications device 110 may initiate a visual search by capturing an image of an object of interest. Because the first data set, specific to the location of the communications device 110, has already been received by the communications device 110, the local search can begin without further communications with the server.

In some aspects, in addition to transmitting a location associated with communications device 110, search component 114 may also forward an accuracy value associated with the location fix. Different location determining technologies may produce location fixes having different accuracy levels. By providing an accuracy value, server 130 (and search component 132) may determine an appropriate search area based on the accuracy of the fix. For example, a larger search area may be required for a less accurate location fix, while a smaller search area may be all that is needed for a more accurate fix.

Search component 132, associated with server 130, may be configured to receive a request, shown at 118, from communications device 110 for a data set representing objects proximate to communications device 110. In some aspects, communications device 110, via search component 114, can submit its location as a set of latitude/longitude coordinates. Search component 132 may be configured to access one or more databases 140, which store object information for the plurality of objects in a location. For example, where the location is a retail store, database 140 may store product information for hundreds of thousands of products located in the store. Database 140 may retrieve, correlate, and store multiple types of information such as, for example, point of interest data 142, product catalog data 144, planogram data 146, and space planning data 148. Point of interest data 142 may represent various places and their location. Product catalog data 144 may represent a list of objects in a location, such as products in a retail store. Planogram data 146 may include product layout information while space planning data 148 may include latitude/longitude coordinates associated with the location of the store. Search component 132 uses the location provided by communications device 110 to narrow down the number of objects to provide for searching. In accordance with some aspects, the data sets submitted by the server 130 to communications device 110, such as data set 134, may include data (shown as Data_A, Data_B, etc.) representing each of the one or more objects in the data set, the data including one or more of a visual representation of each object, a universal product code (UPC) or stock-keeping unit (SKU) associated with each object, a link to additional data associated with each object, or any other information suitable for determining the identity of an object.

Figure 2:
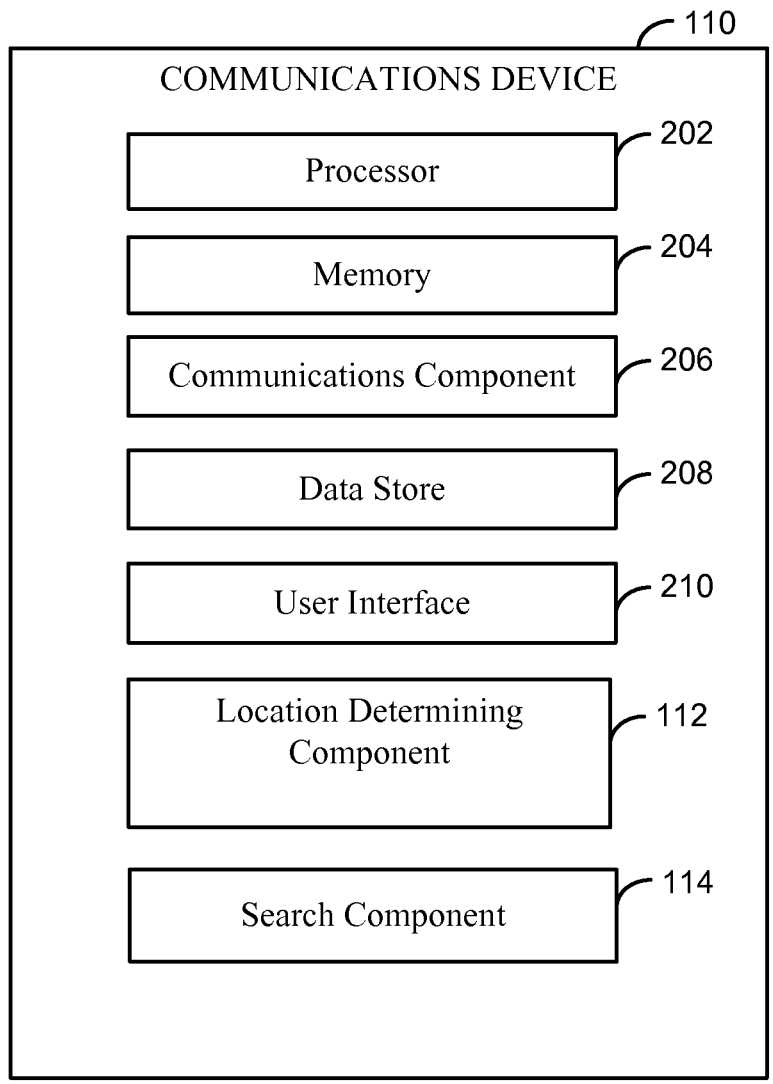
FIG. 2 depicts a communications device, in accordance with some disclosed aspects.

FIG. 2 depicts communications device 110 in greater detail, according to one aspect. Communications device 110 may include a processor 202 for carrying out processing functions associated with one or more of the components and functions described herein. Processor 202 can include a single or multiple set of processors or multi-core processors. Moreover, processor 202 can be implemented as an integrated processing system and/or a distributed processing system.

Communications device 110 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof. Applications may include, for example, one or more object matching applications.

Further, communications device 110 may include a communications component 206 that provides means for establishing and maintaining communications with one or more parties utilizing hardware, software, and services as described herein. Communications component 206 may carry communications between components on communications device 110, as well as between communications device 110 and external devices, such as devices located across a communications network and/or devices serially or locally connected to communications device 110. For example, communications component 206 may include one or more buses, and may further include transmit chain components and receive chain components associated with a transmitter and receiver, respectively, operable for interfacing with external devices such as server 130.

Additionally, communications device 110 may further include a data store 208, which can be any suitable combination of hardware and/or software, that provides for mass storage of information, databases, and programs employed in connection with aspects described herein. For example, data store 208 may be a data repository for applications not currently being executed by processor 202. In some aspects, data store 208 may be located within memory 204.

Communications device 110 may additionally include a user interface component 210 operable to receive inputs, or serving as an application programming interface (API), and may be further operable to generate outputs for presentation to the user. User interface component 210 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. Further, user interface component 210 may include one or more output devices, including but not limited to a display, a speaker, a haptic feedback mechanism, a printer, any other mechanism capable of presenting an output, or any combination thereof. Communications device 110 may also include location determining component 112 and search component 114, described above with respect to FIG. 1.

Figure 3:
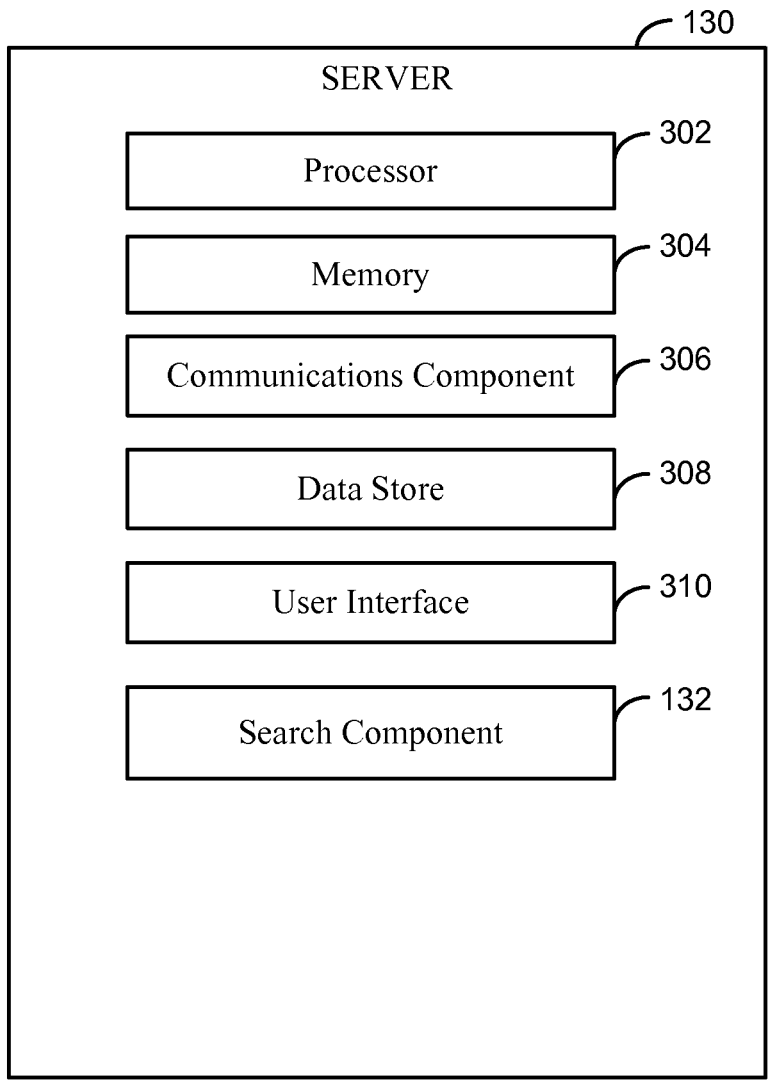
FIG. 3 depicts a server, in accordance with some disclosed aspects.

Turning now to FIG. 3, server 130 is shown in greater detail. Server 130 may include a processor 302, memory 304, communications component 306, data store 308, and user interface 310. These components operate in a manner similar to the corresponding components of communications device 110, and further description will not be provided. Server 130 may also include search component 132, described in more detail above with respect to FIG. 1.

Figure 4:
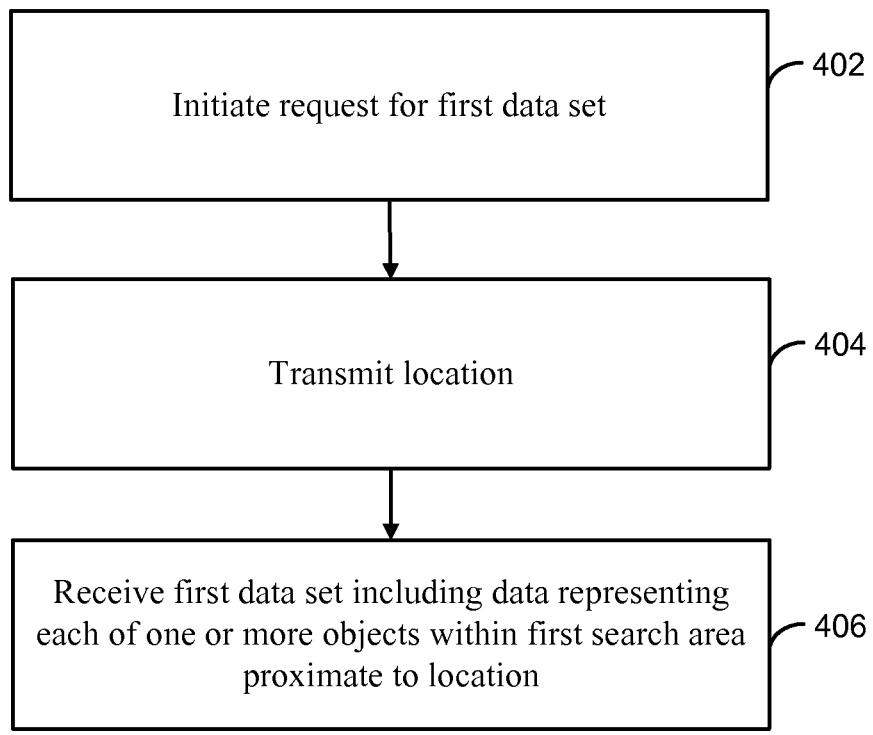
FIG. 4 depicts a method for optimized searching, in accordance with some disclosed aspects.

FIG. 4 is a flowchart depicting a method 400 for receiving a data set, in accordance with some aspects. Method 400 may be performed, for example, by communications device 110. As shown at 402, a first data set may be requested. In some aspects, a request for a first data set may be initiated passively when communications device 110 crosses a geofence or other marker within a location, or scans a tag associated with a particular area. In other aspects, the request for the first data set may be initiated by actively selecting an option to request the first data set.

As shown at 404, a location of the communications device 110 may be determined and transmitted in addition to the request for the first data set. For example, where the request has been initiated passively, the location of the communications device 110 may be determined based on the location of the geofence or other marker triggering initiation of the request. In other aspects, when the request is actively selected, a location of the communications device 110 may be determined, for example, by a GPS or other navigational component associated with the device. In some aspects, an accuracy associated with the location may also be submitted. As shown at 406, the communications device may receive the first data set comprising data representing each of one or more objects within a first search area proximate to the determined location. The first data set may include data associated with each object including, for example, a visual representation of the object, a UPC and/or SKU associated with the object, links to additional information associated with the object, etc. In some aspects, communications device 110 may use the first data set to compare the data representing each object in the first data set to data representing an object of interest in order to determine a match for the object of interest. For example, an object search may be initiated, by obtaining an image related to an object of interest. The image related to the object of interest may be compared to the data in the first data set to determine a match. The image related to the object of interest may be a 3-D image of the object, a 2-D representation of a barcode or quick reference (QR) code associated with the object, etc. Additional requests for additional data sets may be transmitted if a match cannot be found in the first data set or a subsequent data set.

Figure 5:
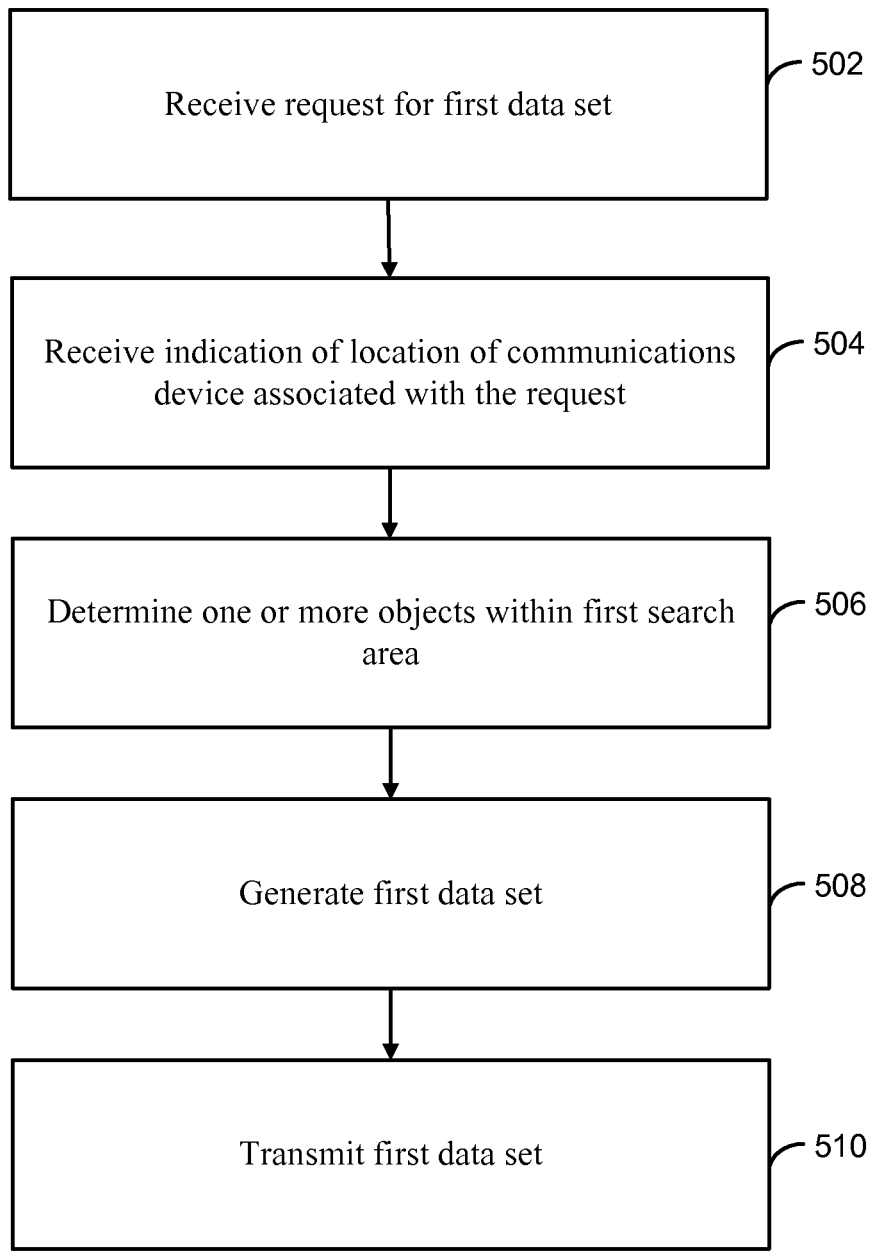
FIG. 5 depicts a method for providing a data set, in accordance with some disclosed aspects.

FIG. 5 is a flowchart depicting a method 500 for providing an optimized data set. The method 500 may be performed, for example, by server 130. As shown at 502, a request for a first data set may be received. An indication of the location of a communications device making the request for the first data set may also be received, as shown at 504. As shown at 506, one or more objects within a first search area proximate to the location of the communications device may be determined. As shown at 508, the first data search set may be generated to include data representing each of the one or more objects within the first search area, and the first data set may be transmitted to the communications device, as shown at 510.

Referring to FIG. 6, an apparatus 600 that optimizes object searching can reside at least partially within communications device 110, according to one aspect. It is to be appreciated that apparatus 600 is represented as including functional blocks, which can represent functions implemented by a processor, software, or combination thereof (e.g., firmware). As such, apparatus 600 includes a logical grouping 602 of electrical components that can act in conjunction. For instance, logical grouping 602 may include means for initiating a request for a first data set (Block 604). For example, in an aspect, the means 604 can include search component 114, communications component 206, and/or processor 202. Logical grouping 602 can include means for transmitting a location of the communications device (Block 606). For example, in an aspect, the means 606 can include location determining component 112, communications component 206, and/or or processor 202. Further, logical grouping 602 can include means for receiving the first data set, the first data set including data representing one or more objects within a first search area proximate to the communications device (Block 608). In an aspect, the means 608 may include search component 114, communications component 206, and/or processor 202.

Additionally, apparatus 600 can include a memory 614 that retains instructions for executing functions associated with blocks 604-608. While shown as being external to memory 614, it is to be understood that one or more of blocks 604-608 can exist within memory 614. In an aspect, for example, memory 614 may be the same as or similar to memory 204 or data store 208 (FIG. 2).

Referring now to FIG. 7, an apparatus 700 that provides an optimized data set can reside at least partially within server 130, according to one aspect. It is to be appreciated that apparatus 700 is represented as including functional blocks, which can represent functions implemented by a processor, software, or combination thereof (e.g., firmware). As such, apparatus 700 includes a logical grouping 702 of electrical components that can act in conjunction. For instance, logical grouping 702 may include means for receiving a request for a first data set (Block 704). For example, in an aspect, the means 704 can include search component 132, communications component 306, and/or processor 302. Logical grouping 702 can include means for receiving an indication of a location of a communications device associated with the request for the first data set (Block 706). For example, in an aspect, the means 706 may include search component 132, communications component 306, and/or processor 302. Logical grouping 702 can also include means for determining one or more objects within a first search area proximate to the location of the communications device (Block 708). For example, in an aspect, the means 708 can include search component 132, communications component 306, and/or processor 302. Further, logical grouping 702 can include means for generating the first data set including data representing each of the one or more objects within the first search area (Block 710). In an aspect, the means 710 may include search component 132 and/or processor 302. Also, logical grouping 702 can include means for transmitting the first data set to the communications device (Block 712). In an aspect, the means 712 may include search component 132, communications component 306, and/or processor 302.

Additionally, apparatus 700 can include a memory 714 that retains instructions for executing functions associated with blocks 704-712. While shown as being external to memory 714, it is to be understood that one or more of blocks 704-712 can exist within memory 714. In an aspect, for example, memory 714 may be the same as or similar to memory 304 or data store 308 (FIG. 3).

In this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communications device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA) and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the operations and/or actions described above.

Further, the operations and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the operations and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for object searching on a communications device, comprising:
   transmitting a request for a first data set, wherein the request does not include data representing an object to be matched;
   transmitting a location of the communications device;
   receiving, at the communications device, the first data set, the first data set including data representing each of one or more objects within a first search area proximate to the location of the communications device; and
   performing, on the communications device, a search by comparing the data representing the object to be matched to the data representing each of the one or more objects within the first data set.

2. The method of claim 1, wherein transmitting the request for the first data set includes transmitting a search request.

3. The method of claim 2, wherein the data representing the object to be matched includes a visual representation of the object to be matched.

4. The method of claim 2, further comprising:
   upon determining that a match cannot be found in the first data set, transmitting a request for a second data set, the second data set including data representing each of one or more objects within a second search area proximate to the location of the communications device; and
   receiving the second data set based on the second search area.

5. The method of claim 4, further comprising:
   performing a search by comparing the data representing the object to be matched to the data representing each of the one or more objects in the second data set.

6. The method of claim 2, wherein transmitting the search request is performed in a retail store, and wherein the first search area comprises one or more aisles within the retail store.

7. The method of claim 1, wherein the first search area is based on an accuracy value associated with the location of the communications device.

8. The method of claim 1, wherein transmitting the request for the first data set is performed in an indoor venue.

9. The method of claim 8, wherein transmitting the location comprises:
   triangulating signals received from wireless access points associated with the indoor venue, and computing the location based on the triangulating.

10. The method of claim 1, wherein the location of the communications device comprises latitude and longitude coordinates.

11. The method of claim 1, wherein each of the one or more objects within the first search area represented by the data in the first data set has longitude and latitude coordinates within the first search area.

12. The method of claim 1, wherein the request for the first data set is transmitted upon crossing a geofence.

13. A non-transitory computer-readable medium for object searching on a communications device, comprising:
   at least one instruction for causing a computer to transmit a request for a first data set, wherein the request does not include data representing an object to be matched;
   at least one instruction for causing the computer to transmit a location of the communications device;
   at least one instruction for causing the computer to receive, at the communications device, the first data set, the first data set including data representing each of one or more objects within a first search area proximate to the location of the communications device; and
   at least one instruction for causing the computer to perform, on the communications device, a search by comparing the data representing the object to be matched to the data representing each of the one or more objects within the first data set.

14. An apparatus for object searching on a communications device, comprising:
   means for transmitting a request for a first data set, wherein the request does not include data representing an object to be matched;
   means for transmitting a location of the communications device;
   means for receiving, at the communications device, the first data set, the first data set including data representing each of one or more objects within a first search area proximate to the location of the communications device; and
   means for performing, on the communications device, a search by comparing the data representing the object to be matched to the data representing each of the one or more objects within the first data set.

15. An apparatus for object searching on a communications device, comprising:
   at least one processor configured to:
      transmit a request for a first data set, wherein the request does not include data representing an object to be matched;
      transmit a location of the communications device;
      receive, at the communications device, the first data set, the first data set including data representing each of one or more objects within a first search area proximate to the location of the communications device; and
      perform, on the communications device, a search by comparing the data representing the object to be matched to the data representing each of the one or more objects within the first data set.

16. The apparatus of claim 15, wherein the at least one processor being configured to transmit the request for the first data set includes the at least one processor being configured to transmit a search request.

17. The apparatus of claim 16, wherein the data representing the object to be matched includes a visual representation of the object to be matched.

18. The apparatus of claim 16, wherein the at least one processor is further configured to:
   upon a determination that a match cannot be found in the first data set, transmit a request for a second data set, the second data set including data representing each of one or more objects within a second search area proximate to the location of the communications device; and
   receive the second data set based on the second search area.

19. The apparatus of claim 18, wherein the at least one processor is further configured to:
   perform a search by comparing the data representing the object to be matched to the data representing each of the one or more objects within the second data set.

20. The apparatus of claim 16, wherein the at least one processor is configured to transmit the search request in a retail store, and wherein the first search area comprises one or more aisles within the retail store.

21. The apparatus of claim 15, wherein the first search area is based on an accuracy value associated with the location of the communications device.

22. The apparatus of claim 15, wherein the at least one processor is configured to transmit the request for the first data set in an indoor venue.

23. The apparatus of claim 22, wherein the at least one processor is further configured to:
triangulate signals received from wireless access points associated with the indoor venue; and
compute the location based on the triangulation.

24. The apparatus of claim 15, wherein the location of the communications device comprises latitude and longitude coordinates.

25. The apparatus of claim 15, wherein each of the one or more objects within the first search area represented by the data in the first data set has longitude and latitude coordinates within the first search area.

26. The apparatus of claim 15, wherein the at least one processor is configured to initiate the request for the first data set upon the communications device crossing a geofence.

27. A method for providing a first data set, comprising:
receiving a request for the first data set, wherein the request does not include data representing an object to be matched;
receiving an indication of a location of a communications device associated with the request for the first data set;
determining one or more objects within a first search area proximate to the location of the communications device;
generating the first data set, the first data set including data representing each of the one or more objects within the first search area; and
transmitting the first data set to the communications device.

28. The method of claim 27, wherein each of the one or more objects within the first search area represented by the data in the first data set has a longitude and latitude associated therewith.

29. The method of claim 27, further comprising:
receiving a request for a second data set;
determining one or more objects within a second search area proximate to the communications device, the second search area being different than the first search area and
generating the second data set, the second data set including data representing each of the one or more objects within the second search area.

30. The method of claim 28, wherein the longitude and latitude associated with each of the one or more objects within the first search area represented by the data in the first data set is derived from one or more of a planogram, a product catalog, or a space plan.

31. A non-transitory computer-readable medium for providing a first data set, comprising:
at least one instruction for causing a computer to receive a request for the first data set, wherein the request does not include data representing an object to be matched;
at least one instruction for causing the computer to receive an indication of a location of a communications device associated with the request for the first data set;
at least one instruction for causing the computer to determine one or more objects within a first search area proximate to the location of the communications device;
at least one instruction for causing the computer to generate the first data set, the first data set including data representing each of the one or more objects within the first search area; and
at least one instruction for causing the computer to transmit the first data set to the communications device.

32. An apparatus for providing a first data set, comprising:
means for receiving a request for the first data set, wherein the request does not include data representing an object to be matched;
means for receiving an indication of a location of a communications device associated with the request for the first data set;
means for determining one or more objects within a first search area proximate to the location of the communications device;
means for generating the first data set, the first data set including data representing each of the one or more objects within the first search area; and
means for transmitting the first data set to the communications device.

33. An apparatus for providing a first data set, comprising:
at least one processor configured to:
receive a request for the first data set, wherein the request does not include data representing an object to be matched;
receive an indication of a location of a communications device associated with the request for the first data set;
determine one or more objects within a first search area proximate to the location of the communications device;
generate the first data set, the first data set including data representing each of the one or more objects within the first search area; and
transmit the first data set to the communications device; and
a memory coupled to the at least one processor.

34. The apparatus of claim 33, wherein each of the one or more objects within the first search area represented by the data in the first data set has a longitude and latitude associated therewith.

35. The apparatus of claim 33, wherein the at least one processor is further configured to:
receive a request for a second data set;
determine one or more objects within a second search area proximate to the communications device, the second search area being different than the first search area; and
generate the second data set, the second data set including data representing each of the one or more objects within the second search area.

36. The apparatus of claim 34, wherein the longitude and latitude associated with each of one or more objects within the first search area represented by the data in the first data set is derived from one or more of a planogram, a product catalog, or a space plan.

* * * * *